United States Patent [19]
Thomsen et al.

[11] Patent Number: 5,686,768
[45] Date of Patent: Nov. 11, 1997

[54] EMERGENCY POWER SYSTEM

[75] Inventors: Ove Lyck Thomsen, Sjølund; Henning Roar Nielsen, Fredericia; Søren Henrik Nielsen Rathmann, Horsens, all of Denmark

[73] Assignee: Silicon Power Electronics A/S, Kolding, Denmark

[21] Appl. No.: 501,095

[22] PCT Filed: Feb. 11, 1994

[86] PCT No.: PCT/DK94/00060

§ 371 Date: Sep. 28, 1995

§ 102(e) Date: Sep. 28, 1995

[87] PCT Pub. No.: WO94/18739

PCT Pub. Date: Aug. 18, 1994

[30] Foreign Application Priority Data

Feb. 12, 1993 [DK] Denmark .................. 0163/93

[51] Int. Cl.⁶ ........................................... H02J 9/06
[52] U.S. Cl. .................. 307/64; 307/66; 323/212; 363/15
[58] Field of Search ................. 307/64, 66, 44; 363/109, 34, 15; 323/207, 212, 224

[56] References Cited

U.S. PATENT DOCUMENTS

| | | | |
|---|---|---|---|
| 4,195,233 | 3/1980 | Udvardi-Lakos | 307/66 |
| 4,277,692 | 7/1981 | Small | 307/64 |
| 4,366,390 | 12/1982 | Rathmann | 307/66 |
| 4,488,057 | 12/1984 | Clarke | 307/66 |
| 4,719,550 | 1/1988 | Powell et al. | 363/37 |
| 4,782,241 | 11/1988 | Baker et al. | 307/66 |
| 4,860,185 | 8/1989 | Brewer et al. | 363/41 |
| 5,502,634 | 3/1996 | Lavrisa | 363/101 |

FOREIGN PATENT DOCUMENTS

0473256  3/1992  European Pat. Off.

*Primary Examiner*—William M. Shoop, Jr.
*Assistant Examiner*—Albert W. Paladini
*Attorney, Agent, or Firm*—Lowe, Price, LeBlanc & Becker

[57] ABSTRACT

An emergency power system is connected between an AC voltage source and a load. The emergency power system ensures a stable voltage on the output, even if the AC voltage received from the AC voltage source is irregular or is interrupted briefly. The emergency power system includes an AC/DC converter coupled between the load terminals and an AC regulator positioned between the AC voltage source and the load. The AC/DC converter is coupled to a chargeable battery and serves as a charging rectifier for the battery in normal operation and as an inverter in emergency operation, the battery voltage being converted to AC voltage on the output of the emergency power system. The AC regulator is built as a controllable current generator supplying on its output an AC current which is in phase with the AC voltage received from the AC voltage source. Irrespective of the energy direction through it, the AC/DC converter maintains the predetermined AC voltage ($V_{OUT}$) across the output terminals of the emergency power system. The system includes a comparator which senses and compares the battery state to a predetermined reference and supplies a signal in response to this. The intensity of the current supplied by the AC regulator is controlled in response to the signal generated by the comparator so that in terms of energy the system is in power balance.

8 Claims, 5 Drawing Sheets

EMERGENCY POWER SYSTEM

BACKGROUND OF THE INVENTION

1. Field of the Invention

The invention concerns an emergency power system of the type defined in the introductory portion of claim 1.

2. Description of the Prior Art

Emergency power systems of this type are connected between an electric device and an AC voltage supply. Many electric devices are now in use where mains outage will be destructive to the function of the device. The devices are in particular such as have a built-in execution of programs, such as computers, since these are sensitive to mains outage that may course erasure of data or faulty execution of the programs. The emergency power systems ensure a stable voltage supply during mains outage for a duration of up to several hours.

It is known e.g. from U.S. Pat. No. 4,366,390 to use a battery which is charged in normal operation and is discharged in emergency operation, and which provides continuous voltage supply to the connected electric device or devices until the mains voltage has been re-established. The battery is connected to the mains connection through a power converter, which serves as a charging rectifier (charger) in normal operation and serves as an inverter (AC/DC voltage converter) in emergency operation. The power converter moreover stabilizes the voltage on the output of the emergency power system, thereby eliminating fluctuations on the mains. The emergency power system according to this principle is connected with a large choke coil on the input side, which absorbs the differences between the fluctuating input and the stabilizing output without losses. Although voltage stabilization takes place without losses, the choke coil gives rise to a power factor which varies with the load and the mains voltage because the choke coil is reactive.

The structure disclosed in said U.S. patent may be called a parallel power converter, since a passive series element in the form of the choke coil cooperates with an active parallel element in the form of the regulating inverter.

SUMMARY OF THE INVENTION

Figure 1:
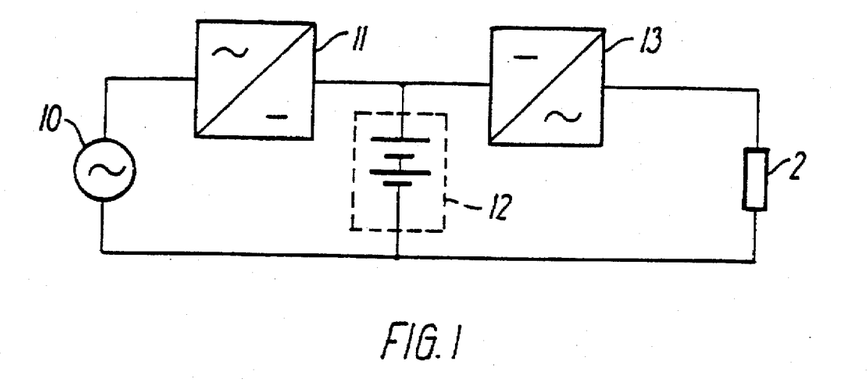
FIGS. 1 and 2 are diagrams showing the principles of known emergency power systems.
Figure 2:
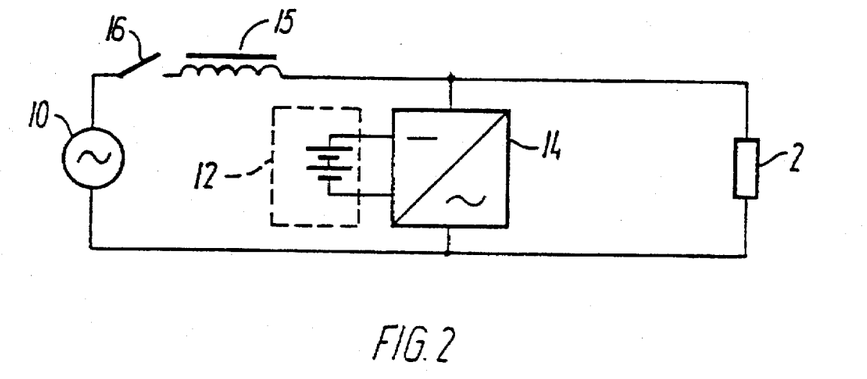

FIGS. 1 and 2 show two well-known structures of UPS systems which both supply a consumer or a load Z with a stabilized voltage. Both systems are connected to an AC voltage generator 10, which may e.g. by a mains connection.

The system shown in FIG. 1 operates as a series power converter, said system comprising a charging rectifier 11 which will normally by thyristor-controlled to generate strong harmonics which will be returned to the mains, unless suitable filtration takes place at the mains connection. The charging rectifier 11 converts an AC voltage, supplied to the input, to an essentially constant output voltage, thereby ensuring that a battery 12 is fully charged. This DV voltage is conducted to an inverter 13 which converts the DC voltage to an AC voltage which is conducted to the load Z. The structure involves two individually regulated converters which operate in series. Accordingly, each of the converters is to convert the full output power, resulting in a low efficiency.

FIG. 2 shows another known UPS system which is described in detail in the U.S. Pat. No. 4,366,390, and which connects an AC voltage source 10 a load Z. The emergency power system has a power converter 14 which operates as a charging rectifier in normal operation, thereby charging the battery 12, and which operates as an inverter in emergency operation, thereby converting the battery voltage to an AC voltage which is supplied to the consumer Z. The emergency power system has a choke coil 15 which absorbs the differences between the stabilized output voltage, supplied to the load Z, and the fluctuating mains voltage received from the voltage source 10. The choke absorbs this difference without losses, but gives rise to a connection power factor which is a function of the angle between the emitted voltage and current. This power factor should be as close to it as possible owing to the voltage source, which requires that current and voltage are in phase. However, with a large reactive component such as a choke coil 15, this is not possible. In addition, the emergency power system comprises a switch 16 which is closed in normal operation, and which is opened in case of mains outage, so that the battery 12 is not caused to operate the mains.

The object of the invention is to provide an improved version of the emergency power system known from said U.S. Pat. No. 4,366,390, wherein the total efficiency of the system is improved, and wherein the drawbacks of a varying loss/connection factor are eliminated.

This object is achieved according to the invention by an emergency power system which is characterized by the features defined in the characterizing portion of claim 1. The choke coil of the prior art is here replaced by an AC regulator which cooperates with and is controlled by the battery voltage. The current through the AC regulator is controlled in response to the need of real power on the output.

Traditional UPS (uninterruptible power supply) systems having a charging rectifier coupled in series with an inverter, with a battery interposed between these, typically have a total efficiency of 85% for a five kVA UPS system. A corresponding UPS system according to U.S. Pat. No. 4,366,390 typically has a total efficiency of 91%, but a 5 kVA UPS system according to the invention may have a total efficiency of about 96%.

The AC regulator is series-connected to the AC voltage source/mains and is controlled so as to constitute an approximately ideal current generator, which means that the AC voltage across the output follows the voltage across the load, while the emitted current is sinusoidal and has a curve shape which is identical with the curve shape of the mains voltage. This is obtained in that the AC regulator is controlled so that it can only receive current in phase with the mains, whereby the current from the regulator is in phase with the mains voltage. The AC regulator hereby just draws real power from the mains, and since it does not contain essential passive, reactive components, it likewise just supplies real power to the inverter and the load.

The function of the inverter in normal operation is to stabilize the output voltage, i.e. the voltage across the load, and to supply reactive or harmonic power if so required by the load. Computer equipment often requires supply of sinusoidal currents which have superimposed harmonic components or are phase-shifted from the voltage.

The inverter is therefore coupled so as to constitute an approximately ideal voltage generator, so that it can maintain the desired sine voltage across the load and also supply a current contribution on which the sinusoidal current provided by the AC regulator is superimposed. The battery, together with the inverter, serves as a kind of buffer between the AC regulator and the load, the inverter supplying the differences in power between the real power supplied by the AC regulator and the power applied to the load. The inverter obtains the necessary power from the connected, chargeable battery. The need for supply of real power from the mains to supply the load, to cover losses in the inverter and to charge the battery, if necessary, is recognized by monitoring the state of the battery. An insufficient power supply from the mains can be detected by measuring the battery voltage, since this will drain the battery of energy, causing a drop in voltage.

It may be said that in the invention, as defined in claim 1, the system will be in balance in terms of power, since the mains exclusively supplies real power, and the remaining part of the power expended by the load is supplied by the inverter. The remaining part of the power consumption is supplied as reactive energy or higher harmonic and is obtained from the battery, which is kept constantly charged by increasing or reducing the real power supplied from the mains.

It may be said that the function of the emergency power system as a regular standby source has been expanded to also having an important function in operation, viz. to ensure that the load in the form of the electric device on the output of the emergency power system only draws real power from the mains and thereby has a connection factor which is close to or is equal to one.

The subclaims describe expedient details in an emergency power system according to the invention, and claim 2 thus describes an expedient embodiment in which the AC regulator is divided into two parallel current paths, which are respectively conductive in the positive and negative, half-periods of the mains voltage. When the current in the current path is regulated, as described in claim 3, the use of reactive components can practically be avoided, and the reactive components used nevertheless are of a size such that they practically do not affect the connection factor of the emergency power system. Claim 4 states how the pulse generator generates a pulse signal, and the parameters necessary to obtain this signal. For control purposes the current through the AC regulator may expediently be sensed, as stated in claim 5.

Claim 6 states how the output voltage of the system is kept at a stable level, while claims 7 and 8 state the components which the current path of the AC regulator expediently comprises.

The invention will be explained more fully below in connection with a preferred embodiment and with reference to the drawing, in which:

DESCRIPTION OF THE PREFERRED EMBODIMENT

Figure 3:
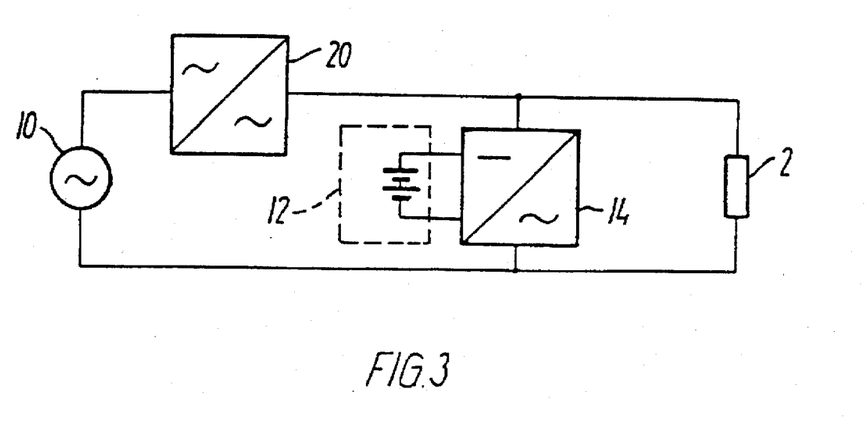
FIG. 3 is a corresponding diagram showing the principle of a preferred embodiment of an emergency power system according to the invention.

FIG. 3 shows the fundamental principle of the structure of an emergency power system according to the invention, and it will seen that the system comprises a battery 12 which is charged with an AC voltage, which is rectified by a current converter 14 serving as a charging rectifier in normal operation. In emergency operation the power converter 14 serves as an inverter, the battery voltage from the battery 12 being converted to AC voltage which is supplied to the load Z. In replacement of the choke coil 15 in the configuration shown in FIG. 2 the emergency power system of the invention has an AC regulator 20, which regulates the current from the voltage source 10 in response to the need for real power to the output of the emergency power system. This will be described in detail in connection with the subsequent figures.

Figure 6:
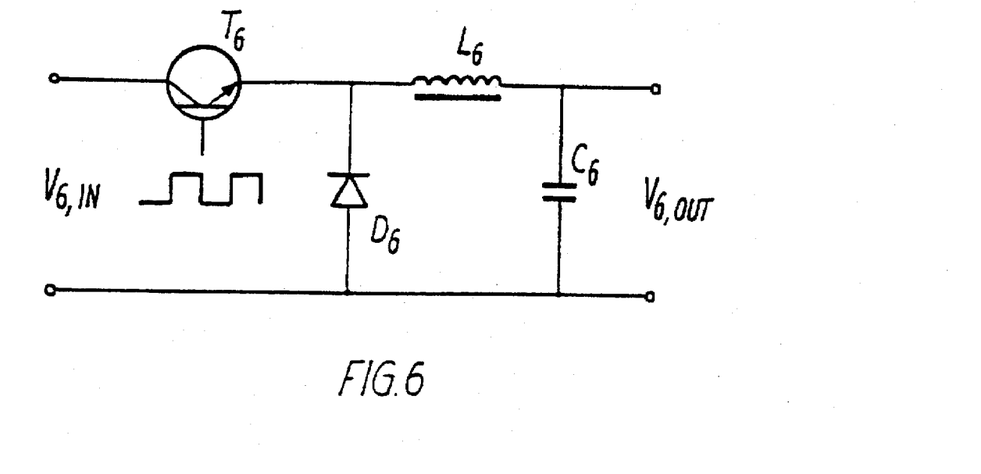
FIGS. 6–8 show amplifier configurations used in the power converter part shown in FIG. 5.

FIG. 6 shows a transistor circuit which will be well-known to a person skilled in the art, and which is incorporated as part of the AC regulator in a preferred embodiment of an emergency power system according to the invention. A positive input voltage $V_{6,IN}$, which is supplied to the collector input of a transistor $T_6$, is applied to the circuit. The base input of the transistor $T_6$ is controlled by a periodic signal having a variable duty cycle D, i.e. the part of the period of the signal in which a signal level different from zero occurs, can be varied. A diode $D_6$, which is conductive in a direction from zero to the emitter of the transistor, is interposed between the emitter input of the transistor and zero. An inductance $L_6$ is connected between the emitter of the transistor and one output terminal of the transistor circuit. A signal having the input signal as the envelope and having a frequency corresponding to the frequency of the periodic signal applied to the base of the transistor, will appear on the emitter of the transistor. Further, the output terminals of the transistor circuit have interposed between them a large smoothing capacitor $C_6$, across which there will be a voltage $V_{6,OUT}$ which has a size determined by $V_{6,IN}$ multiplied by the duty cycle D. Since the duty cycle will be between 0 and 1, such a transistor circuit provides a pulse-controlled amplifier having a gain between 0 and 1. The output voltage $V_{6,OUT}$ may also be expressed as follows:

$$V_{6,OUT} = V_{6,IN} D.$$

Figure 7:
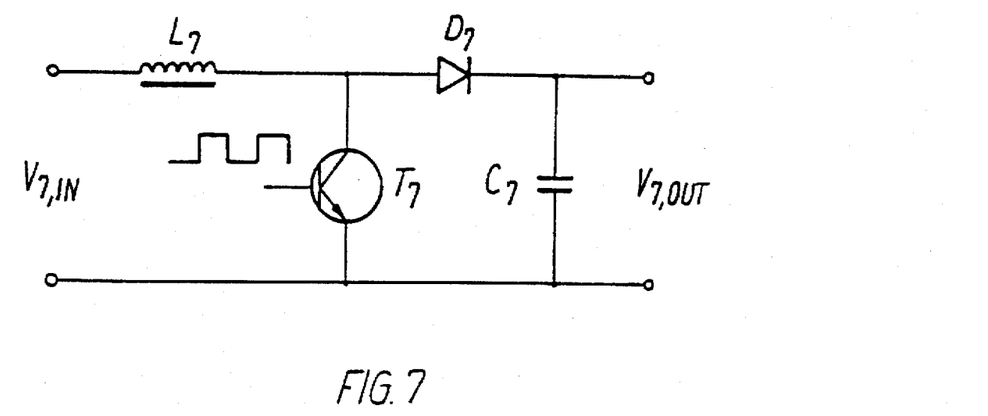

FIG. 7 similarly shows another transistor coupling in which the input has applied to it a positive input voltage $V_{7,IN}$, which is supplied to the collector on a transistor $T_7$ through an inductance $L_7$. The transistor $T_7$ is controlled by a periodic signal having a variable duty cycle D applied to the base electrode, and its emitter electrode is connected to zero. A diode $D_7$ is connected between the collector of the transistor $T_7$ and one output terminal of the transistor circuit and is conductive in a direction toward this terminal. A large smoothing capacitor $C_7$ is arranged across the output, so that the output voltage $V_{7,OUT}$ can be expressed by the input voltage $V_{7,IN}$ divided by 1 less the duty cycle D. Since the duty cycle will be between 0 and 1, it will be possible to obtain a gain greater than 1 for the amplifier, so that the output voltage may expressed as follows:

$$V_{7,OUT} = V_{7,IN}/(1-D).$$

Figure 8:
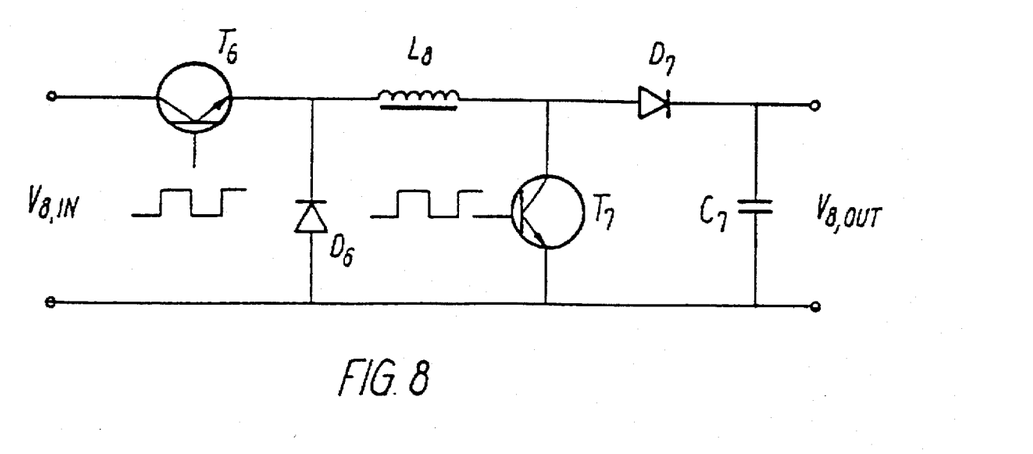

In FIG. 8 the transistor couplings shown in FIGS. 6 and 7 are coupled to form an integral circuit. The input voltage $V_{8,IN}$ corresponds to the input voltage $V_{6,IN}$. If the periodic signals controlling the transistors $T_6$ and $T_7$ are identical and in phase, it is not necessary to smooth the signals till on the output of the circuit, since the transistors $T_6$ and $T_7$ will be conductive simultaneously. Accordingly, the capacitor $C_6$ may be omitted, and the inductances $L_6$ and $L_7$ may be wound together to an integral inductance $L_8$. The voltage $V_{6,OUT}$ corresponds to the voltage $V_{7,IN}$, so that the circuit shown in FIG. 8 will be able to supply an output voltage $V_{8,OUT}$, which can be expressed by the input voltage $V_{8,IN}$ and the duty cycle D. Hence, $$V_{8,OUT}=V_{8,IN}D/(1-D).$$

However, it is frequently preferred to control the two transistor couplings individually, so that one stage merely transfers the input voltage to the output in that the control signal is either high (FIG. 6) or low (FIG. 7), and that the second stage is pulse-controlled. If the input voltage $V_{8,IN}$ is to be amplified, the control voltage to the transistor $T_6$ is made high, and the transistor $T_7$ is pulse-modulation controlled to provide the desired voltage. Conversely, if the input voltage $V_{8,IN}$ is to be attenuated, the control voltage to the transistor $T_7$ is made low, and the transistor $T_6$ is pulse-modulation controlled to attenuate the applied voltage. The capacitor between the two transistor stages can still be omitted, because one transistor merely transfers the input voltage to its output. When working with different control signals on the two transistors, the output voltage $V_{8,OUT}$ may be expressed by the duty cycles $D_{T6}$ and $D_{T7}$ of the control signals. Hence:

$$V_{8,OUT}=V_{8,IN}D_{T6}/(1-D_{T7}),$$

where the duty cycle $D_{T6}$ is 1 or $D_{T7}$ is 0 in normal operation, because one of the control signals concerned is either high or low.

Figure 4:
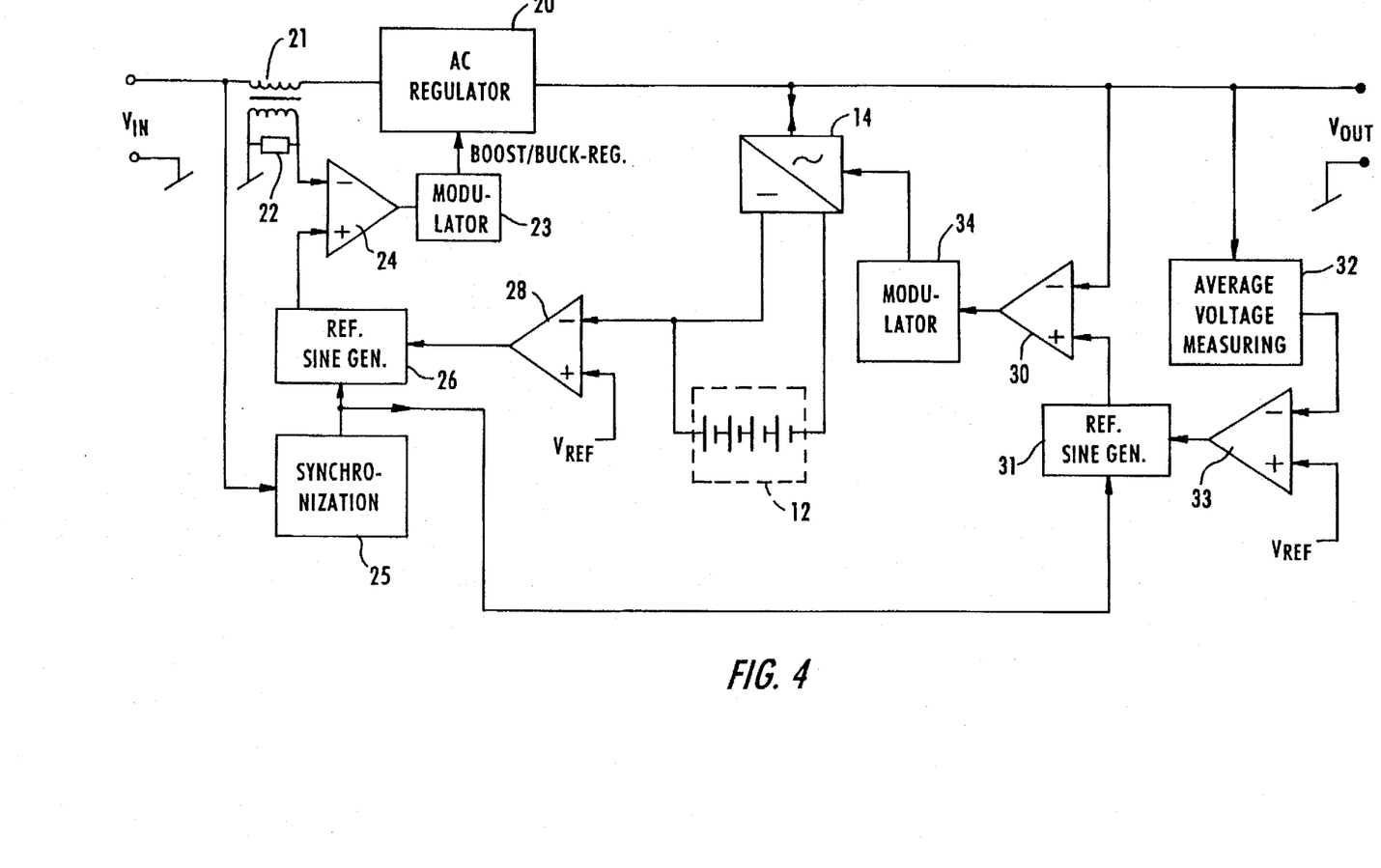
FIG. 4 shows a preferred embodiment of the control part for an emergency power system according to the invention.
Figure 5:
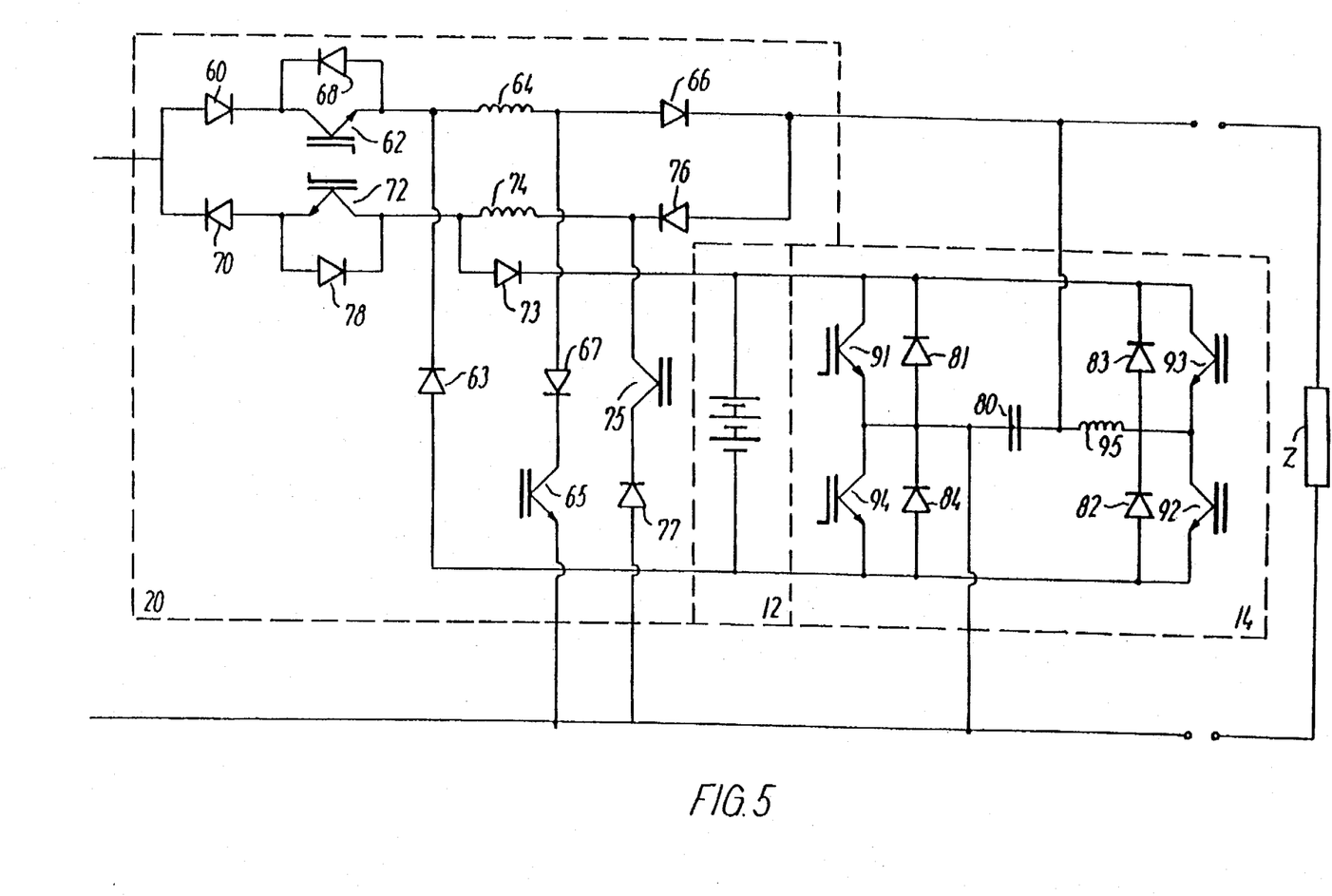
FIG. 5 shows a preferred embodiment of a power converter part for an emergency power system.

FIG. 4 illustrates the control principle for an AC voltage regulator which is shown in detail in connection with FIG. 5. It should be noted that the control of the power converter part 14 (FIG. 3) is only shown in outline, because it is disclosed in its essentials in the Applicant's own U.S. Pat. No. 4,366,390.

FIG. 4 shows a synchronization unit 25 which is connected to the AC voltage supply and controls two sine generators 26, 31, which are kept synchronous and in phase with the AC voltage supply, and whose amplitudes can be controlled by applied DC voltages. The voltage from the sine generator 26 is applied to the positive input on an error amplifier 24, whose negative input is connected to a power transformer 21 arranged in series with the input terminal of the emergency power system. The power transformer 21 is loaded by a resistor 22 to produce a voltage on the negative input of the error amplifier 24, said voltage being proportional to the current in the input terminal of the emergency power system. The signal from the error amplifier 24 is applied to a modulator 23 which generates the modulation signals to the transistors 62, 65, 72, 75 shown in FIG. 5. These transistors are modulated so as to maintain, at any time, the smallest possible or no deviation between the two signals applied to the input of the error amplifier 24. If the instantaneous value of the measured input current has a lower amplitude than the desired value from the sine generator 26, the duty cycle of the control signals is changed in a direction which increases the gain in the AC power regulator 20, which increases the input current to the system. If, correspondingly, the measured input current has a higher amplitude than the desired value from the sine generator 26, the duty cycle of the control signals is changed in a direction which reduces the gain in the AC power regulator 20 resulting in a reduced input current. This regulation ensures that input currents are always proportional to the signal from the sine generator concerning amplitude as well curve shape, so that the input current to the system will always be sinusoidal and in phase with the input voltage. This ensures that the emergency power system can keep a power factor of 1 no matter what happens on the load side, since the power converter 14 compensates for phase shifts, if any, between current and voltage on the output of the emergency power system if the load is reactive.

To control the amplitude on the sine generator 26 and thereby the power drawn by the emergency power system from the voltage supply (the mains), the charged state of the battery is monitored. This monitoring is performed by an error amplifier 28, which receives a measurement value proportional to the battery voltage on its negative input and receives a constant reference value $V_{REF}$, by means of which the desired charged voltage on the battery 12 is determined, on its positive input. The error amplifier 28 controls the amplitude on the sine generator 26 such that the lowest possible or no deviations between the two signals applied to the input of the error amplifier 28 are obtained. If the battery voltage is lower than the desired reference value, the voltage to the sine generator 26 is increased, which means that the current and thereby the power received from the mains are increased.

The voltage $V_{OUT}$ on the output of the emergency power system and thereby the power consumed by the load are kept constant, so that increased power taken from the mains through the AC regulator 20 can only be transferred to the battery 12 through the current converter 14, which charges the battery 12, resulting in increased battery voltage. Thus, the entire emergency power system will constantly be in balance in terms of power, so that a constant charging voltage is maintained in the battery 12, no matter whether the input voltage or the load is changed.

The remaining circuits shown in FIG. 4 serve to keep the AC voltage from the power converter 14 constant irrespective of changes in battery voltage and load. This must be considered prior art, which is employed e.g. in the emergency power systems shown in FIGS. 1 and 2. The control will therefore just be described briefly below. The signal from the sine generator 31 is compared with the actual output voltage $V_{OUT}$ of the system in an error amplifier 30. The signal from the error amplifier 30 controls the transistors of the power converter 14 through a modulator 34 to provide the smallest possible or no difference between the two signals on the input of the error amplifier 30. To obtain increased voltage stability the average voltage of the system output voltage $V_{OUT}$ is measured with an average voltage measuring circuit 32, and the amplitude of the sine generator 31 is regulated up or down by means of an error amplifier 33, thereby constantly keeping the average value of the system output voltage $V_{OUT}$ at a value determined by a reference $V_{REF}$ applied to the positive input of the error amplifier 33. The modulation signals from the AC regulator 20 as well as the AC/DC converter 14 have a frequency which is typically between 100–1000 times greater than the frequency of the AC voltage applied to the input of the emergency power system.

FIG. 5 schematically shows the design of the emergency power system of the invention, the control units being omitted here for clarity, so that only the power transferring parts of the system are shown. The AC voltage regulator 20 is here shown in detail, and it will be seen that it is built as a Boost/Buck converter. The AC voltage regulator 20 has two current branches which are conductive in the positive and in the negative half-period, respectively, of the AC voltage applied across the input.

The first one of the current branches accommodates a diode 60 which is conductive in the positive half-period of the applied AC voltage. After the diode 60 a voltage-controlled transistor 62 of the IGBT type (insulated gate bipolar transistor) is connected in parallel with a feed back return path diode 68. The transistor 62 is controlled by a periodic signal applied to its gate electrode, said signal being generated by the modulator 23 shown in FIG. 4. The duty cycle of this signal can be regulated, which is described in connection with FIG. 4. The emitter output of the transistor 62 is connected to the negative electrode of the battery 12 via a diode 63. An inductance 64 is likewise connected to the node between the transistor 62 and the diode 63. It will be seen that the transistor 62, the diode 63 and the inductance 64 form a transistor configuration which substantially corresponds to the one described in connection with FIG. 6.

In addition, the inductance 64 is connected to another node, between which and ground a diode 67 is arranged in series with a transistor 65 corresponding to the transistor 62 and controlled in the same manner. The diode 67 and the transistor 65 are arranged so that a current can flow from the node with the inductance 64 and the diode 67 toward ground. The node between the diode 67 and the inductance 64 is moreover connected to one output terminal of the emergency power system through a diode 66, which is polarized so that a current can flow toward the output. The diode 67 protects the transistor 65 against oppositely directed currents and provides, in its conductive state, a voltage drop between the node between the transistor 65 and the node between the diode 67 and the inductance 64.

The inductance 64, in combination with the transistor 65, the diode 66 and a smoothing capacitor 80 disposed between the output terminals of the emergency power system, constitutes a transistor coupling corresponding to the one shown in FIG. 7. These components, in combination with the transistor 62 and the diode 63, form a transistor configuration corresponding to the one shown in FIG. 8. Correspondingly, the other branch of the AC regulator 20 is built in a completely equivalent manner to the first branch, all unidirectional components being inverted so that this branch is conductive in the negative half-period of the applied AC voltage. Thus, this branch comprises a diode 70 connected to a transistor 72, which corresponds to the transistor 62, and which is connected in parallel to a feedback diode 78. The other node between the diode 78 and the transistor 72 is connected to the positive electrode of the battery 12 through a diode 73 and to an inductance 74, whose other terminal is connected to the output terminal of the emergency power system through a diode 76 and to zero through a transistor 75 and a diode 77. The transistor 75 generally corresponds to the transistors 65, 62 and 72, and all these are controlled by individual control signals—either square signals or high/low voltages (on/off).

If a positive half period of the input signal is considered, the current paths 60–68 will be conductive. If the input voltage is higher than the output voltage, the voltage has to be attenuated, and, cf. the discussion in connection with FIG. 8, the transistor 65 will receive a control signal which is low or off, so that it will be in reverse mode. The transistor 62 receives the pulse width modulation signal and reduces the voltage in response to this.

When comparing FIG. 5 with FIG. 8, it will be seen that the diodes 63 and 73 in FIG. 5 are connected to the negative terminal and the positive terminal, respectively, on the battery 12, instead of to zero, as was the case in connection with FIG. 8. If the diodes 63 and 73 had been connected to ground, this would establish an undesirable current path which would short-circuit the output voltage of the system to zero through the diodes 63 and 66 and the inductance 64 in the negative half-period. Correspondingly, in positive half-periods the system would be short circuited to zero through the diodes 73 and 76 and the inductance 74. To prevent this, the fact that the two transistors 91 and 94 in the current converter 14 are always controlled in simple phase opposition to the output frequency of the power system is turned to account, so that the transistor 94 is always conductive and the transistor 91 is always interrupted in the positive half-period of the voltage, and conversely in the negative half-period. This ensures that the diode 63 has a power current to ground through the transistor 94 during the positive half-period in which the diode is to be used. In the negative half-period the current path through the diode 63 cannot be condutive, since the potential on the negative terminal of the battery is lower (more negative) than the instantaneous values of the voltage which appears on the output of the system. It similarly applies to the diode 73 that it has a current path to ground through the transistor 91 during the negative half-period, while it is kept in reverse mode by means of the voltage of the battery during the positive half-period.

The transistors 92 and 93 are controlled by pulse width modulated square voltages having a high frequency, so that the voltage in the node between the two transistors 92 and 93 forms the desired sinusoidal voltage on the output of the system, the capacitor 80 together with an inductance 95 forming a lowpass filter. The diodes 80, 84 ensure that no matter which of the four transistors 91–94 are conductive or interrupted, there is always a current path from the inductance 95 through the battery 12 to the capacitor 80. A current running in the inductance 95 can thus not subject the transistors 91–94 to destructive error polarizations. The function of the diodes 81–84 and the transistors 91–94 may be regarded as general prior art known from the current converters which are shown in connection with FIGS. 1 and 2. The control of the transistors 91–94 is the same no matter whether the system is in normal operation or in emergency operation where the entire AC regulator 20 is dead.

The control principle of the power converter is generally described in the Applicant's U.S. Pat. No. 4,366,390.

FIG. 5 has been described in outline, because it will e.g. be clear to a skilled person that the shown diodes will be provided with a parallel decoupling capacitor. It will likewise be evident to a skilled person how the controlled signals are coupled to the base inputs on the transistors.

Figure 9:
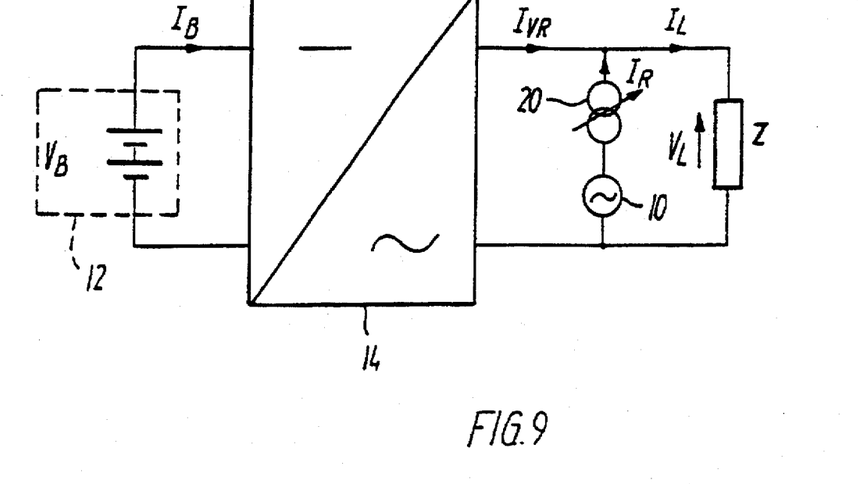
FIGS. 9–10 show an equivalence diagram for the emergency power system according to the invention and the currents running in the system, respectively.
Figure 10:
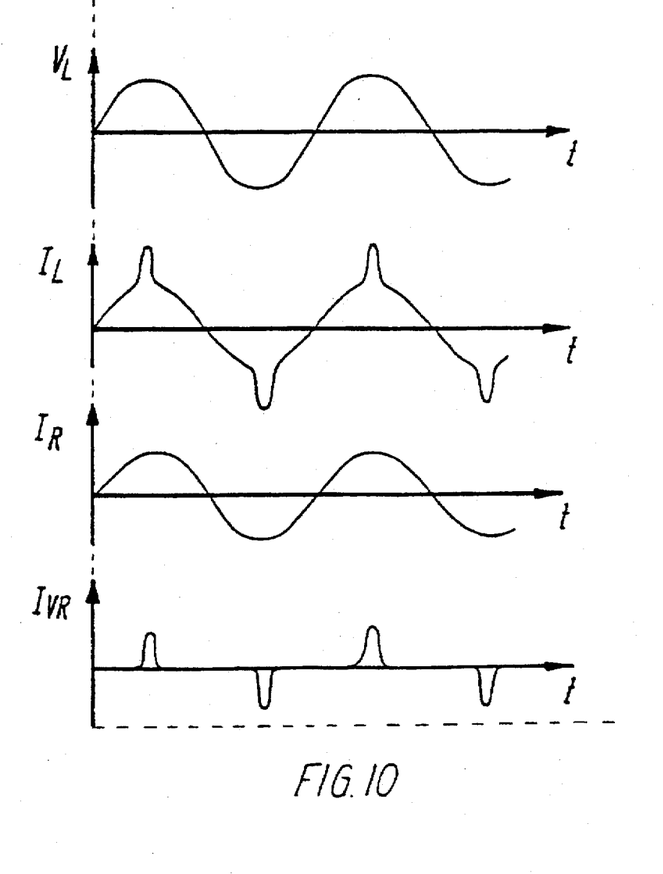

It appears from FIG. 9 how the inverter 14 is coupled to the battery 12, across which there is a battery voltage $V_B$. The inverter 14 receives battery current $I_B$ from the battery 12 and supplies a current contribution $I_{VR}$ to the load Z. The inverter 14 maintains a predetermined AC voltage $V_L$ across the load Z. The current regulator is indicated as a controllable current generator 20 in FIG. 9, which, in series with the AC voltage source 10, is connected in parallel to the inverter 14. The variable current generator supplies a current $I_R$ which is sinusoidal, as shown in FIG. 10. The voltage $V_L$ across the load Z is likewise shown to be sinusoidal in FIG. 10. FIG. 10 shows that the load current $I_L$ is substantially sinusoidal, but has superimposed higher harmonic oscillations. The power for the higher harmonic oscillations is provided by the inverter 14, and this can thus supply a current $I_{VR}$ corresponding to the one shown in FIG. 10. It will be seen that the current $I_L$ across the load Z is esstentially in phase with the load voltage $V_L$, so that in this case the load Z is essentially resistive. If, however, the load Z was partly reactive, the load current $I_L$ would be phase shifted with respect to the load voltage $V_L$. This would not change the curve shape of the current generator current $I_R$, but would cause the inverter current $I_R$ to assume a sine shape which would be phase shifted with respect to the current $I_R$ so that the sum of the currents $I_{V_R}$ and $I_R$ would provide the current $I_L$ necessary for the load.

We claim:

1. An emergency power system for connection between a pair of input terminals for an AC voltage source and a pair of output terminals for a load, said emergency power system ensuring a stable voltage across the pair of output terminals even if the AC voltage received from the AC voltage source is irregular or is briefly interrupted, said emergency power system comprising:

an AC regulator coupled between said input terminals and said output terminals, said AC regulator including a controllable current generator for supplying on its output an AC current which is in-phase with the voltage received from the AC voltage source;

a chargeable battery;

an AC/DC converter coupled to the output of the controllable current generator, to the pair of output terminals, and to the chargeable battery, for serving as a charging rectifier for the battery in normal operation and as an inverter for converting the battery voltage to an AC voltage when said AC source is irregular or interrupted, a control circuit coupled to said pair of output terminals and to said AC/DC converter, for controlling said AC/DC converter to maintain a predetermined AC voltage across said pair of output terminals; and a comparator coupled to said battery and to said AC regulator, for sensing the battery voltage and comparing it with a reference voltage, and for providing a control signal for controlling the intensity of the current supplied by said controllable current generator.

2. An emergency power system according to claim 1, characterized in that the AC regulator comprises two parallel current paths, which are in conductive and in reverse mode, respectively, during the positive and negative half-periods of the AC voltage applied to the input of the system.

3. An emergency power system according to claim 1, characterized in that the current in the current paths are pulse-controlled by a periodic square signal, and that the system further comprises a pulse generator which generates a square signal whose duty cycle is regulated in response to the signal generated by the comparator.

4. An emergency power system according to claim 3, characterized in that the pulse generator comprises a sine generator which is synchronized with the AC voltage source by a synchronization unit and is controlled by the signal generated by the comparator, and that an error amplifier followed by a modulator generates the periodic square signal in response to a comparison between the signal generated by the sine generator and a reference AC voltage signal.

5. An emergency power system according to claim 4, characterized in that the reference AC voltage signal used in the error amplifier is a measure of the current received from the AC voltage source, said measure being provided through a current transformer having a load resistance coupled to the input terminal of the system.

6. An emergency power system according to claim 3, characterized by detection means for detecting deviations in the output voltage of the system with respect to a reference voltage ($V_{REF}$), and by compensation means compensating for deviations by changing the periodic square signals—in response to the actual output voltage—which control the AC/DC converter so that it maintains a constant output voltage.

7. An emergency power system according to claim 2, characterized in that one current path comprises a transistor whose emitter is connected to the negative electrode of the battery through a diode, which is conductive in a direction toward the emitter, an inductance whose one terminal is connected to the emitter of the transistor and whose other terminal in connected to the output terminal of the emergency power system through a diode, which is conductive in a direction toward the output, and a transistor which is connected to ground.

8. An emergency power system according to claim 2, characterized in that the other current path comprises a transistor whose collector is connected to the positive electrode of the battery through a diode which is conductive in a direction toward the battery electrode, an inductance whose one terminal is connected to the collector of the transistor and whose other terminal is connected to the output terminal of the emergency power system through a diode, which is conductive in a direction toward the inductance, and to a transistor which is connected to ground.

* * * * *